US012803448B2

(12) United States Patent
Guo et al.

(10) Patent No.: US 12,803,448 B2
(45) Date of Patent: Nov. 17, 2026

(54) CONTROLLER, ISOLATED POWER CONVERTER AND CONTROL METHOD

(71) Applicant: SHANGHAI BRIGHT POWER SEMICONDUCTOR CO., LTD., Shanghai (CN)

(72) Inventors: Yanmei Guo, Shanghai (CN); Zhen Zhu, Shanghai (CN); Yucai Yang, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 240 days.

(21) Appl. No.: 18/643,731

(22) Filed: Apr. 23, 2024

(65) Prior Publication Data

US 2024/0364222 A1 Oct. 31, 2024

(30) Foreign Application Priority Data

Apr. 28, 2023 (CN) ......................... 202310486048.7

(51) Int. Cl.
*H02M 3/335* (2006.01)
*H02M 1/36* (2007.01)

(52) U.S. Cl.
CPC ......... *H02M 3/33523* (2013.01); *H02M 1/36* (2013.01)

(58) Field of Classification Search
CPC ................. H02M 1/0006; H02M 1/36; H02M 3/335–33592
See application file for complete search history.

(56) References Cited

U.S. PATENT DOCUMENTS

| | | | | |
|---|---|---|---|---|
| 11,018,595 | B1 * | 5/2021 | Kuchipudi | H02M 3/33523 |
| 2013/0300384 | A1 * | 11/2013 | Wang | H02M 1/36 323/271 |
| 2025/0105747 | A1 * | 3/2025 | Guo | H02M 1/36 |

FOREIGN PATENT DOCUMENTS

| | | | |
|---|---|---|---|
| CN | 102655373 | A | 9/2012 |
| CN | 106533214 | A | 3/2017 |
| CN | 111478589 | A | 7/2020 |
| CN | 111917300 | A | 11/2020 |
| CN | 115149811 | A | 10/2022 |

* cited by examiner

*Primary Examiner* — Fred E Finch, III
(74) *Attorney, Agent, or Firm* — MUNCY, GEISSLER, OLDS & LOWE, P.C.

(57) ABSTRACT

A controller, an isolated power converter and a control method are disclosed. The controller includes a primary-side regulator and a secondary-side regulator. The secondary-side regulator includes a secondary-side regulation signal generation module, which receives a feedback signal of an output voltage of the isolated power converter, generates a first control signal and couples the first control signal to the primary-side regulator. The primary-side regulator includes: a PSR module, which receives a voltage signal across a winding of the isolated power converter and generates a second control signal, thereby executing a PSR mode; a follow-up SSR module, which receives the first control signal and generates a third control signal, thereby executing an SSR mode; and a regulation switching module, which allows a switching between the PSR and SSR modes. The present invention allows the follow-up SSR module to enable the SSR mode, which avoids overshooting of the output voltage during startup.

15 Claims, 6 Drawing Sheets

CONTROLLER, ISOLATED POWER CONVERTER AND CONTROL METHOD

CROSS-REFERENCES TO RELATED APPLICATION

This application claims the priority of Chinese patent application number 202310486048.7, filed on Apr. 28, 2023, the entire contents of which are incorporated herein by reference.

TECHNICAL FIELD

The present invention relates to design of power converters and, in particular to, a controller, an isolated power converter and a control method for the isolated power converter.

BACKGROUND

Most flyback isolated power supplies are optical coupling-based ones mainly featuring a simplified secondary side, which, for example, can be implemented simply by a TL431 device. These optical coupling-based power supplies are disadvantageous in the occurrence of optical attenuation and inferior dynamic response compared with ripple-based ones. Despite better dynamic response than that of optical coupling-based ones, a secondary side of a ripple-based flyback isolated power supply requires a magnetic or capacitive coupling device for coupling a control signal to a primary-side regulator. As both magnetic and capacitive coupling are driven by electric power, during startup, energy must be transferred to the secondary side by a primary-side MOS under the control of the primary-side regulator. A secondary-side regulator can start normal operation to control a switch for the primary-side MOS to transfer energy to the secondary side, only after a voltage across a bypass capacitor in a secondary-side chip reaches a predetermined value.

FIG. 1 is a schematic illustration of a conventional isolated power converter. As shown in FIG. 1, the isolated power converter includes a primary-side circuit, a secondary-side circuit and a transformer, the transformer is coupled between the primary-side circuit and the secondary-side circuit to provide electrical isolation. The primary-side circuit includes a primary-side chip, and the secondary-side circuit includes a secondary-side chip. The primary-side chip and the secondary-side chip are isolated by an isolator from each other and communicate with each other. The isolated power converter further includes an input terminal and an output terminal. The input terminal is coupled to receive an input voltage, which may be a rectified and filtered AC voltage. The output terminal provides an output voltage to an electric load, such as a tablet computer.

A startup process of existing isolated power converters involves: connecting with an AC power source; rising of a power supply voltage of the primary-side chip; the primary-side chip starting operation and control of the primary-side MOS; generation of a voltage in a secondary-side winding, which supplies power to the secondary-side chip through a pin Forw; rising of a power supply voltage of the secondary-side chip; and the secondary-side chip starting operation and control of the primary-side MOS.

However, this process is associated with the disadvantages as follows: if the secondary-side chip has great VCC capacitance or a small high-voltage current through the pin Forw, overshooting of the output voltage tends to occur during startup.

SUMMARY

It is an objective of the present invention to provide a controller, an isolated power converter and a control method, which can prevent an output voltage overshoot during startup.

In a first aspect of the present invention, there is provided a controller for use with an isolated power converter, the controller including a primary-side regulator and a secondary-side regulator, the secondary-side regulator including a secondary-side regulation signal generation module, which receives a feedback signal of an output voltage of the isolated power converter, generates a first control signal and couples the first control signal to the primary-side regulator, the primary-side regulator including:

a primary-side regulation (PSR) module, which receives a voltage signal across a winding in the isolated power converter and generates a second control signal for controlling a state of the primary-side power transistor, thereby executing a PSR mode;

a follow-up secondary-side regulation (SSR) module, which receives the first control signal and generates a third control signal for controlling the state of the primary-side power transistor, thereby executing an SSR mode; and a regulation switching module, which receives the first control signal and thereby executes a switching of the primary-side regulator between the PSR and SSR modes.

Optionally, the PSR module may receive the voltage signal across two terminals of an auxiliary winding in the isolated power converter, which is coupled to a primary-side winding in the isolated power converter. Alternatively, the PSR module may receive the voltage signal across two terminals of the primary-side winding in the isolated power converter.

Optionally, the PSR module may include:

a sample-and-hold module, which receives the voltage signal and samples the voltage signal after the primary-side power transistor is turned off as an output voltage sample signal;

a first operational amplifier, which amplifies an error between the output voltage sample signal and a first reference value and outputs a primary-side amplified error signal;

a first frequency control module, which receives the primary-side amplified error signal and outputs a primary-side frequency control signal for controlling a switching frequency of the primary-side power transistor; and a turn-off control module, which receives the primary-side amplified error signal and outputs a primary-side on-time control signal for controlling an on-time of the primary-side power transistor.

Optionally, the primary-side regulator may include:

a first drive generator module, which receives the primary-side frequency control signal, the primary-side on-time control signal and a primary-side current sample signal, provides a turn-on instruction to the primary-side power transistor based on the primary-side frequency control signal, provides a turn-off instruction to the primary-side power transistor based on the primary-side on-time control signal and the primary-side current sample signal, and outputs the second control signal to the primary-side power transistor, wherein the first drive generator module includes:

a first comparator, which compares the primary-side on-time control signal with the primary-side current sample signal, outputs a first comparison result and provides an indication of a turn-on timing of the primary-side power transistor based on the first comparison result; and a first logic circuit, which generates the second control signal based on the first comparison result and the primary-side frequency control signal.

Optionally, the secondary-side regulation signal generation module may include:

a second comparator, which compares the feedback signal with a second reference value, outputs a second comparison result and generates the first control signal that indicates a turn-on timing of the primary-side power transistor based on the second comparison result.

Optionally, the secondary-side regulation signal generation module may include:

a second operational amplifier, which amplifies an error between the feedback signal and a second reference value and outputs a secondary-side amplified error signal; and a second frequency control module, which receives the secondary-side amplified error signal and outputs the first control signal that indicates a turn-on timing of the primary-side power transistor.

Optionally, the follow-up SSR module may include:

a frequency-based on-time control circuit, which receives the first control signal and outputs a secondary-side on-time control signal for controlling an on-time of the primary-side power transistor; and a second drive generator module, which receives the first control signal, the secondary-side on-time control signal and a primary-side current sample signal and outputs the third control signal to the primary-side power transistor.

Optionally, the follow-up SSR module may include:

a timing circuit, which receives the first control signal and outputs, if the first control signal instructs to turn on the primary-side power transistor, the secondary-side on-time control signal for controlling the on-time of the primary-side power transistor, after the elapse of a predetermined period of time; and a second drive generator module, which receives the first control signal and the secondary-side on-time control signal and outputs the third control signal to the primary-side power transistor.

Optionally, the secondary-side regulation signal generation module may include:

a second comparator, which compares the feedback signal with a second reference value, outputs a second comparison result and provides an indication of a turn-on timing of the primary-side power transistor based on the second comparison result;

a timing circuit, which starts a timer based on the turn-on timing of the primary-side power transistor and outputs, after the elapse of a predetermined period of time, a secondary-side on-time control signal for controlling an on-time of the primary-side power transistor; and a second logic circuit, which generates the first control signal based on the second comparison result and the secondary-side on-time control signal.

Optionally, the secondary-side regulation signal generation module may include:

a second operational amplifier, which amplifies an error between the feedback signal and a second reference value and outputs a secondary-side amplified error signal;

a second frequency control module, which receives the secondary-side amplified error signal and outputs a second frequency control signal indicating a turn-on timing of the primary-side power transistor; and a timing circuit, which starts a timer based on the turn-on timing of the primary-side power transistor and outputs, after the elapse of a predetermined period of time, a secondary-side on-time control signal for controlling an on-time of the primary-side power transistor; and a second logic circuit, which generates the first control signal based on the second frequency control signal and the secondary-side on-time control signal.

Optionally, the follow-up SSR module may include a second drive generator module, which receives the first control signal and generates the third control signal for controlling the state of the primary-side power transistor.

Optionally, when the primary-side regulator is in the PSR mode, upon the regulation switching module receiving the first control signal that is valid, then the primary-side regulator may switch from the PSR mode to the SSR mode, wherein when the primary-side regulator is in the SSR mode, if the regulation switching module does not receive the first control signal that is valid within a predetermined period of time, then the primary-side regulator switches from the SSR mode to the PSR mode.

Optionally, the PSR module may enable the PSR mode, in which the output voltage rises up to a first reference value, wherein the follow-up SSR module executes the SSR mode, in which the output voltage rises up to a second reference value, and wherein the first reference value is not greater than the second reference value.

In a second aspect of the present invention, there is provided an isolated power converter including the controller as defined above.

In a third aspect of the present invention, there is provided a control method for an isolated power converter, which includes:

at a secondary-side regulation signal generation module, receiving a feedback signal of an output voltage of the isolated power converter, generating a first primary-side power transistor control signal and coupling the first control signal to a primary-side regulator;

at a primary-side regulation (PSR) module, receiving a voltage signal across a winding in the isolated power converter and generating a second primary-side power transistor control signal for controlling a state of the primary-side power transistor, thereby executing a PSR mode;

at a follow-up secondary-side regulation (SSR) module, receiving the first control signal and generating a third primary-side power transistor control signal for controlling the state of the primary-side power transistor, thereby executing an SSR mode;

at a regulation switching module, receiving first control signal and executing a switching of the primary-side regulator between the PSR and SSR modes; and during startup of the isolated power converter, first executing the PSR mode by the PSR module and then causing a mode switching by the regulation switching module so that the SSR mode is enabled by the follow-up SSR module.

In summary, the present invention provides a controller, an isolated power converter and a control method. The controller includes a primary-side regulator and a secondary-side regulator. The secondary-side regulator includes a secondary-side regulation signal generation module, which receives a feedback signal of an output voltage of the isolated power converter, generates a first control signal and couples the first control signal to the primary-side regulator. The primary-side regulator includes a PSR module, which receives a voltage signal across a winding of the isolated power converter and generates a second control signal for controlling a state of the primary-side power transistor, thereby executing a PSR mode. The primary-side regulator also includes a follow-up SSR module, which receives the first control signal and generates a third control signal for controlling the state of the primary-side power transistor, thereby executing an SSR mode. The primary-side regulator also includes a regulation switching module, which receives the first control signal and thereby allows a switching of the primary-side regulator between the PSR and SSR modes. During startup of the isolated power converter, the PSR mode is first enabled by the PSR module, and a mode switching is then caused by the regulation switching module to allow the follow-up SSR module to enable the SSR mode. This can avoid overshooting of the output voltage during startup.

BRIEF DESCRIPTION OF THE DRAWINGS

Those of ordinary skill in the art would appreciate that the accompanying drawings are provided to facilitate a better understanding of the present invention and do not limit the scope thereof in any sense, in which.

In these figures: 10—secondary-side regulator; 11—secondary-side regulation signal generation module; 20—primary-side regulator; 21—PSR module; 22—follow-up SSR module; 23—regulation switching module; 100—isolated power converter; 101—input terminal; 102—output terminal; 103—isolated transformer; 104—primary-side winding; 105—secondary-side winding; 106—auxiliary winding; 107—primary-side power transistor; 108—clamp circuit; 109—synchronous rectification circuit; 110—output capacitor; 111—coupler; 112—node; 113—second comparator; 114—first transmitter; 115—second operational amplifier; 116—second frequency control module; 117—second transmitter; 118—second logic circuit; 119—timing circuit; 120—third transmitter; 211—sample-and-hold module; 212—first operational amplifier; 213—first frequency control module; 214—turn-off control module; 215—first drive generator module; 2151—first comparator; 2152—first logic circuit; 221—frequency-based on-time control circuit; 222—second drive generator module.

DETAILED DESCRIPTION

Objectives, advantages and features of the present invention will become more apparent upon reading the following more detailed description of specific embodiments thereof with reference to the accompanying drawings. Note that the figures are provided in a very simplified form not necessarily drawn to exact scale and for the only purpose of facilitating easy and clear description of the embodiments. In addition, the structures shown in the figures are usually part of actual structures. In particular, as the figures tend to have distinct emphases, they are often drawn to different scales.

As used herein, the singular forms “a”, “an” and “the” include plural referents, unless the context clearly indicates otherwise. As used herein, the term “or” is generally employed in the sense of “and/or”, unless the context clearly indicates otherwise. As used herein, the term “a number of” is generally employed in the sense of “at least one”, unless the context clearly indicates otherwise. As used herein, the term “at least two” is generally employed in the sense of “two or more”, unless the context clearly indicates otherwise. Additionally, the use of the terms “first”, “second” and “third” herein is intended for illustration only and is not to be construed as denoting or implying relative importance or as implicitly indicating a numerical number of the referenced items. Accordingly, defining an item with “first”, “second” or “third” is an explicit or implicit indication of the presence of one or at least two such items.

In principle, the present invention seeks to provide a controller, an isolated power converter and a control method, which can prevent overshooting of an output voltage during startup of an isolated power converter.

Figure 1:
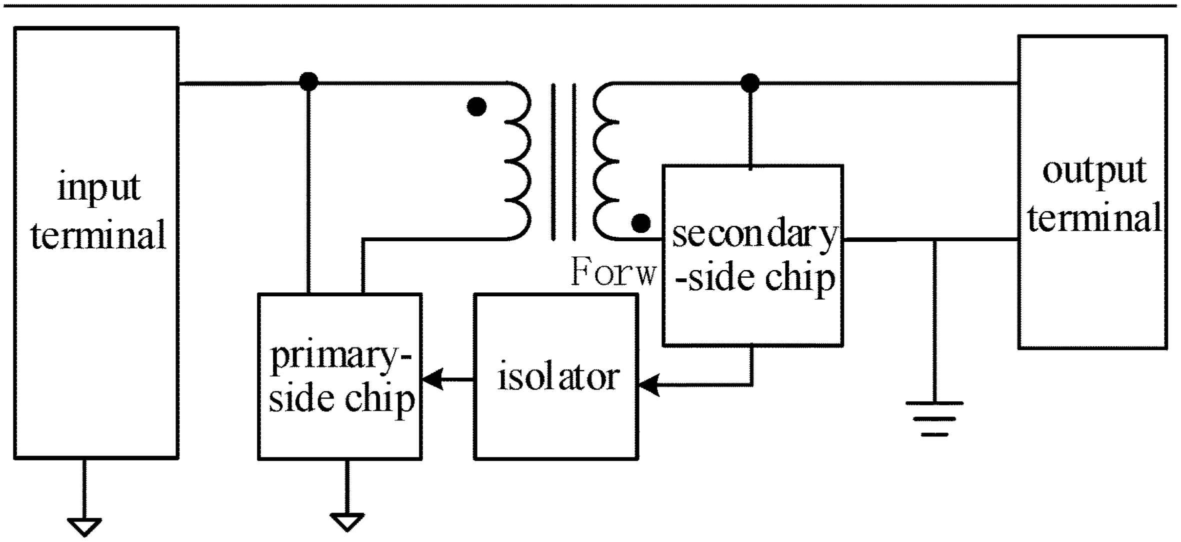
Fig. 1 Prior Art
FIG. 1 is a schematic illustration of a conventional isolated power converter.
Figure 2:
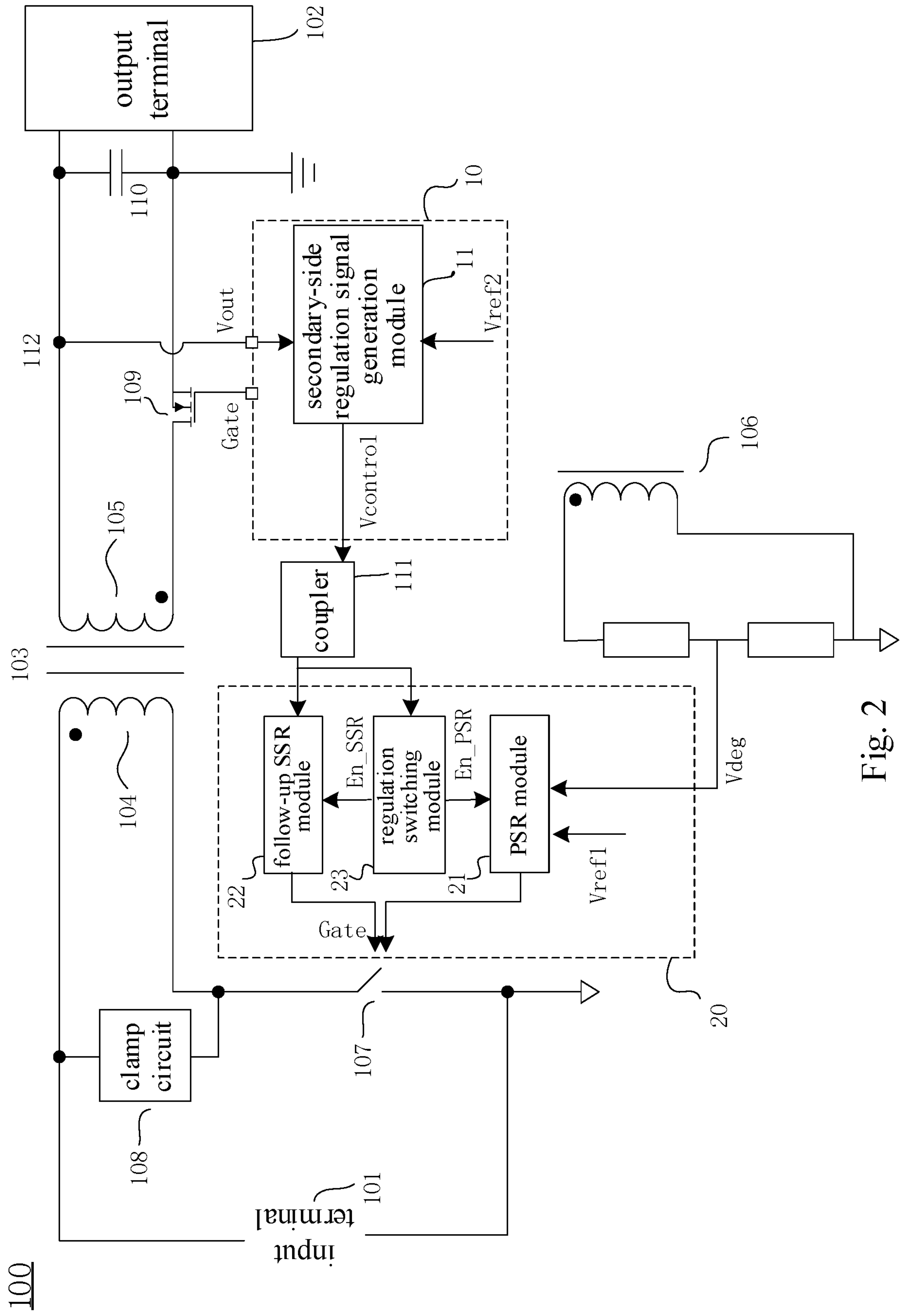
FIG. 2 is a schematic illustration of an isolated power converter according to an embodiment of the present invention.

FIG. 2 is a schematic illustration of an isolated power converter according to an embodiment of the present invention. Referring to FIG. 2, the isolated power converter 100 includes an input terminal 101 and an output terminal 102. The input terminal 101 is coupled to receive an input voltage, the input voltage may be an AC voltage that has been rectified and filtered. The output terminal 102 provides an output voltage to an electric load such as a tablet computer. After a startup process of the isolated power converter 100, the output voltage may be adjusted to a desired value. Therefore, the output voltage may also be referred to as the “adjusted output voltage”. The output terminal 102 is coupled to an output capacitor 110 for smoothing the adjusted output voltage.

The isolated power converter 100 includes an isolated transformer 103, the isolated transformer 103 includes a primary-side winding 104, a secondary-side winding 105 and an auxiliary winding 106. The isolated transformer 103 provides electrical isolation between the primary-side circuit and the secondary-side circuit of the isolated power converter 100.

The isolated power converter 100 further includes a primary-side regulator 20, a secondary-side regulator 10 and a primary-side power transistor 107. The primary-side regulator 20, the secondary-side regulator 10 and the primary-side power transistor 107 may be all incorporated in an integrated circuit (IC) package.

In one embodiment, in the IC package, the first and second IC chips may be encapsulated in an encapsulation body. The encapsulation body may be an enclosure or plastic film that wraps or encloses one or more IC chips and part of a lead frame. The first IC chip may include the primary-side regulator 20 and the primary-side power transistor 107, and the second IC chip may include the secondary-side regulator 10.

In an alternative embodiment, the IC package may include a first IC chip including the primary-side power transistor 107, a second IC chip including the primary-side regulator 20 and a third circuit chip including the secondary-side regulator 10.

The chip including the primary-side regulator 20 is electrically isolated from the chip including the secondary-side regulator 10. In this way, the secondary-side regulator 10 is electrically isolated from the primary-side regulator 20 and the primary-side power transistor 107. Although the primary-side regulator 20, the secondary-side regulator 10 and the primary-side power transistor 107 have been exemplified as being included in a single IC package, in other embodiments, one or more of the primary-side regulator 20, the secondary-side regulator 10 and the primary-side power transistor 107 may be included in an IC package.

The primary-side regulator 20 is coupled to primary-side circuit components in the isolated power converter 100, such as the primary-side power transistor 107 and a clamp circuit 108. The secondary-side regulator 10 is coupled to secondary-side circuit components in the isolated power converter 100. For example, the secondary-side regulator 10 is coupled to the secondary-side winding 105, the output terminal 102, a synchronous rectification circuit 109 and other circuit components. The primary-side regulator 20 and the secondary-side regulator 10 control the circuitry of the isolated power converter 100 and hence energy transfer from the input terminal 101 to the output terminal 102.

Although the primary-side regulator 20 and the secondary-side regulator 10 are electrically isolated from each other, the secondary-side regulator 10 can transfer a control signal to the primary-side regulator 20. For example, an isolated coupler 111 (e.g., a magnetic or capacitive coupling element) may be used to couple or transfer a control signal to the primary-side regulator 20. The primary-side power transistor 107 may be a high-voltage power switch. In one embodiment, the primary-side power transistor 107 may be a power metal-oxide-semiconductor field-effect transistor (MOSFET). During operation, the primary-side regulator 20 controls a current through the primary-side power transistor 107 and the primary-side winding 104. In general, the primary-side power transistor 107 may be in an ON state (e.g., serving as a turned-on switch) or an OFF state (e.g., as a turned-off switch), depending on a switch drive signal generated by the primary-side regulator 20.

The clamp circuit 108 is coupled to the primary-side winding 104 of the isolated transformer 103. As a result, a maximum voltage on the primary-side power transistor 107 can be limited during transitions of the primary-side power transistor 107 between the ON and OFF states. In one embodiment, in response to a transition of the primary-side power transistor 107 from the ON state to the OFF state, the synchronous rectification circuit 109 is turned on under the control of the secondary-side regulator 10, allowing efficient charging of the output capacitor 110.

In this embodiment, the secondary-side regulator 10 includes a secondary-side regulation signal generation module 11, the secondary-side regulation signal generation module 11 receives a feedback signal of the output voltage of the isolated power converter 100, generates a first primary-side power transistor control signal Vcontrol and couples the first control signal to the primary-side regulator 20.

The secondary-side regulator 10 includes multiple terminals connected to the secondary-side circuit. In FIG. 2, only terminals Gate and Vout are shown. The terminal Gate is coupled to the synchronous rectification circuit 109 to allow control of the synchronous rectification circuit 109. The terminal Vout is coupled to a node 112 at the secondary side of the isolated power converter 100. The node 112 is an output node of the isolated power converter 100, at which the adjusted output voltage is output. Through the terminal Vout, the secondary-side regulator 10 can receive a feedback signal Vout that reflects the output voltage of the isolated power converter 100.

The primary-side regulator 20 includes a primary-side regulation (PSR) module 21, a follow-up secondary-side regulation (SSR) module and a regulation switching module 23. The PSR module 21 receives a voltage signal from the winding of the isolated power converter 100 and generates a second control signal for controlling the state of the primary-side power transistor 107, thereby executing a PSR mode. The follow-up SSR module 22 receives the first control signal and generates a third control signal for controlling the state of the primary-side power transistor 107, thereby executing an SSR mode. The regulation switching module 23 receives the first control signal and thereby executes a switching of the primary-side regulator 20 between the PSR and SSR modes.

It is to be noted that the PSR module 21 generates the second control signal for controlling the state of the primary-side power transistor 107 and the follow-up SSR module 22 generates the third control signal for controlling the state of the primary-side power transistor 107. Accordingly, in FIG. 2, the arrowed lines leading respectively from the PSR module 21 and the follow-up SSR module 22 both towards the primary-side power transistor 107 indicate that the primary-side power transistor 107 can be controlled by the output signals of the two modules. However, in practical circuit designs, there may be only a single connection connecting the primary-side regulator 20 to the primary-side power transistor 107. The connection may transmit the second or third control signal to the primary-side power transistor 107. Alternatively, it is also possible to transmit the second and third control signals from the primary-side regulator 20 to the primary-side power transistor 107 through respective connections. In this case, at any moment, only the control signal in one of the connections is valid.

During startup of the isolated power converter 100 in this embodiment, at first, the PSR module 21 generates the second control signal that controls the state of the primary-side power transistor 107 and thereby executes the PSR mode. After that, the regulation switching module 23 performs a mode switching based on the first control signal that it receives. As a result, the follow-up SSR module 22 generates the third control signal that controls the state of the primary-side power transistor 107 and thereby executes the SSR mode. That is, during startup of the isolated power converter 100, it operates first in the PSR mode and then in the SSR mode. This can prevent overshooting of the output voltage during the process of startup.

In one embodiment, referring to FIG. 2, the PSR module 21 receives a voltage signal Vdeg across two terminals of the auxiliary winding 106 in the isolated power converter 100. The auxiliary winding 106 is coupled to the primary-side winding 104 of the isolated power converter 100. Of course, as an input terminal of the PSR module 21 is connected to a node between two resistors connected in series with the auxiliary winding 106, the voltage signal Vdeg indicates a fraction of the voltage across the terminals of the auxiliary winding 106. In an alternative embodiment, the PSR module 21 may receive a voltage signal (not shown) across two terminals of the primary-side winding 104 in the isolated power converter 100. The PSR module 21 obtains information on the output voltage by sampling the voltage across the terminals of the auxiliary winding 106, or the voltage across the terminals of the primary-side winding 104.

Figure 3:
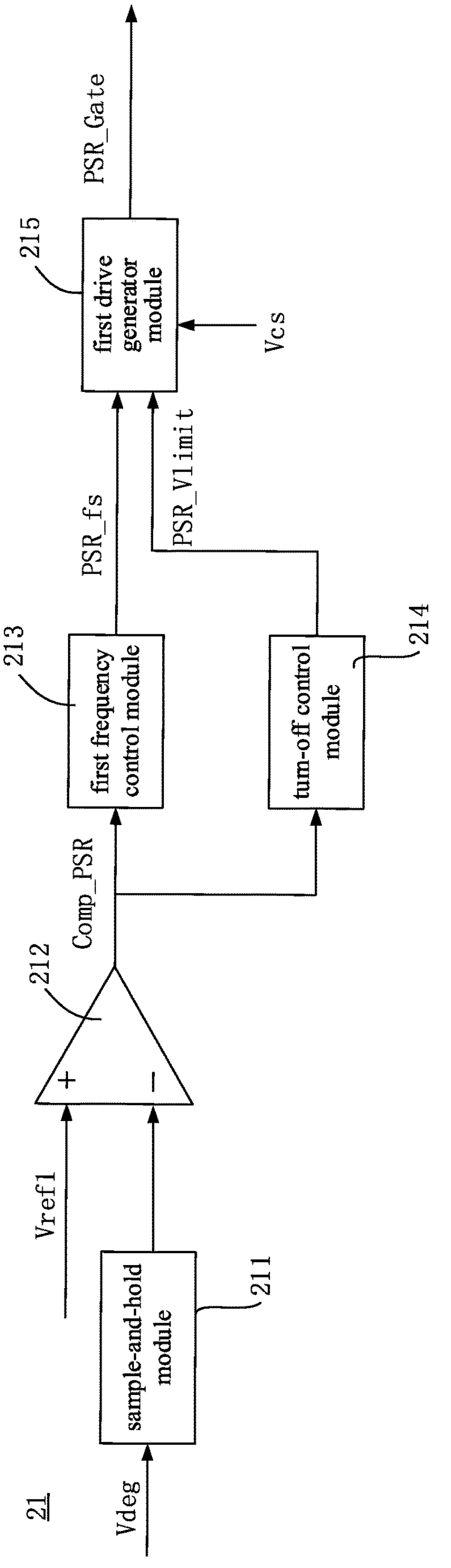
FIG. 3 is a schematic illustration of a PSR module according to an embodiment of the present invention.

FIG. 3 is a schematic illustration of the PSR module according to an embodiment of the present invention. Referring to FIG. 3, the PSR module 21 includes a sample-and-hold module 211, a first operational amplifier 212, a first frequency control module 213 and a turn-off control module 214. The sample-and-hold module 211 receives the voltage signal Vdeg, samples the voltage signal after the primary-side power transistor 107 is turned off and takes it as an output voltage sample signal. The first operational amplifier 212 amplifies an error between the output voltage sample signal and a first reference value Vref1 and outputs a primary-side amplified error signal Comp_PSR. The first frequency control module 213 receives the primary-side amplified error signal Comp_PSR and outputs a primary-side frequency control signal PSR_fs for controlling a switching frequency of the primary-side power transistor 107. The turn-off control module 214 receives the primary-side amplified error signal Comp_PSR and outputs a primary-side on-time control signal PSR_Vlimit for controlling an on-time of the primary-side power transistor 107.

The PSR module 21 further includes a first drive generator module 215. Alternatively, the first drive generator module 215 may be included in the primary-side regulator 20. The first drive generator module 215 receives the primary-side frequency control signal PSR_fs, the primary-side on-time control signal PSR_Vlimit and a primary-side current sample signal Vcs. Moreover, it provides a turn-on instruction to the primary-side power transistor based on the primary-side frequency control signal PSR_fs and a turn-off instruction to the primary-side power transistor 107 based on the primary-side on-time control signal PSR_Vlimit and the primary-side current sample signal Vcs. Further, it outputs the second control signal PSR_Gate to the primary-side power transistor 107.

Specifically, the voltage signal Vdeg is transmitted to an input terminal of the sample-and-hold module 211, and the output voltage sample signal is output from an output terminal of the sample-and-hold module 211 to an inverting input terminal of the first operational amplifier 212. The first reference value Vref1 is input to a non-inverting input terminal of the first operational amplifier 212, and the primary-side amplified error signal Comp_PSR is output from an output terminal of the first operational amplifier 212 to an input terminal of the first frequency control module 213 and an input terminal of the turn-off control module 214. The primary-side frequency control signal PSR_fs is output from an output terminal of the first frequency control module 213 to an input terminal of the first drive generator module 215 to control the frequency of the primary-side power transistor 107, that is, to control a turn-on timing of the primary-side power transistor 107. The primary-side on-time control signal PSR_Vlimit is output from an output terminal of the turn-off control module 214 to another input terminal of the first drive generator module 215 to control the on-time of the primary-side power transistor 107, that is, to control a turn-off timing of the primary-side power transistor 107. The second control signal PSR_Gate is output from an output terminal of the first drive generator module 215 to control turn-on and turn-off of the primary-side power transistor 107.

Figure 4:
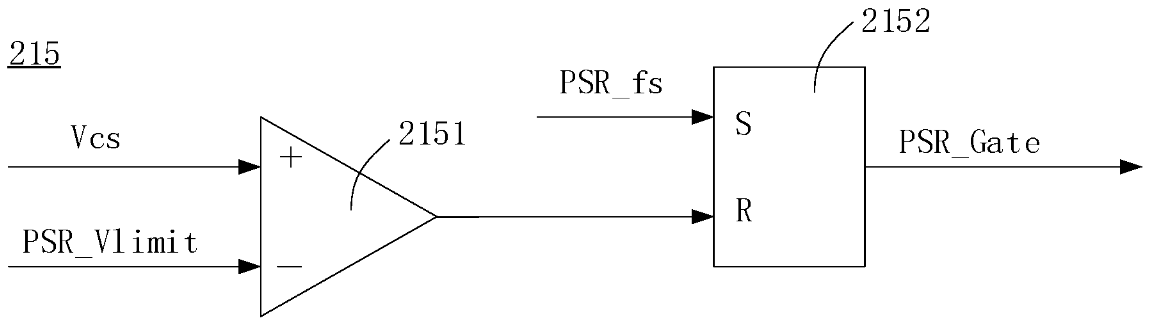
FIG. 4 is a schematic illustration of a first drive generator module according to an embodiment of the present invention.

FIG. 4 is a schematic illustration of the first drive generator module according to an embodiment of the present invention. Referring to FIG. 4, the first drive generator module 215 includes a first comparator 2151 and a first logic circuit 2152. In this embodiment, the first logic circuit 2152 is, for example, a standalone RS flip-flop. The first comparator 2151 compares the primary-side on-time control signal PSR_Vlimit with the primary-side current sample signal Vcs and outputs a first comparison result indicative of a turn-on timing of the primary-side power transistor. The first logic circuit 2152 produces the second control signal PSR_Gate from the first comparison result and the primary-side frequency control signal PSR_fs. In this embodiment, the primary-side current sample signal Vcs is a signal obtained by sampling a current through the primary-side winding 104 in the isolated transformer 103.

Specifically, the primary-side current sample signal Vcs is input to a non-inverting input terminal of the first comparator 2151, and the primary-side on-time control signal PSR_Vlimit is input to an inverting input terminal of the first comparator 2151. The first comparison result is output from an output terminal of the first comparator 2151 to a reset terminal R of the flip-flop. The primary-side frequency control signal PSR_fs is input to a set terminal of the flip-flop, and the second control signal PSR_Gate is output from an output terminal of the flip-flop. The second control signal PSR_Gate controls turn-on and turn-off timings of the primary-side power transistor 107 and hence the state of the primary-side power transistor 107, thereby executing the PSR mode.

For example, when the primary-side current sample signal Vcs has a higher level than the primary-side on-time control signal PSR_Vlimit, a high level is output from the output terminal of the first comparator 2151 to a reset terminal R of the first logic circuit 2152, and a low level is output from an output terminal of the first logic circuit 2152. As a result, the primary-side power transistor 107 is turn off.

Figure 5:
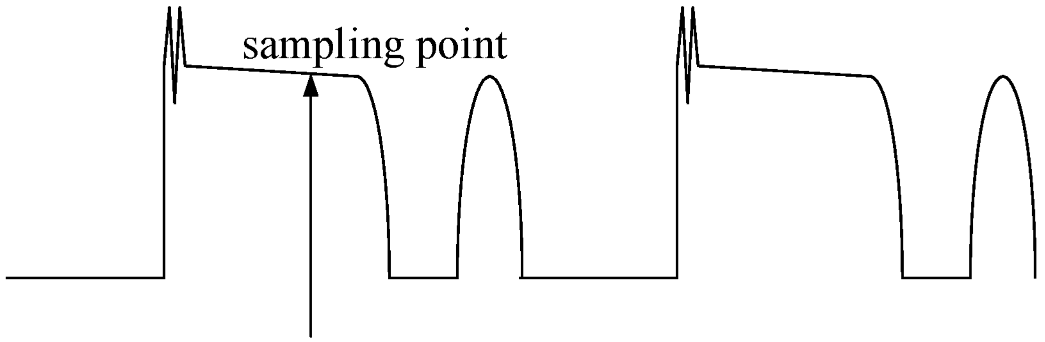
FIG. 5 shows a waveform diagram of a voltage signal across a winding of an isolated power converter according to an embodiment of the present invention.

FIG. 5 shows a waveform diagram of the voltage signal across a winding of the isolated power converter according to an embodiment of the present invention. Referring to FIG. 5, after the primary-side power transistor 107 is turned off, a voltage of the voltage signal Vdeg is sampled as an output voltage sample signal after the voltage signal across the winding becomes stable. That is, information about the output voltage is obtained. In the example of FIG. 5, the sampling occurs when the voltage signal becomes relatively stable, for example, after the emergence of voltage spikes caused by turn-off of the primary-side power transistor 107.

Figure 6:
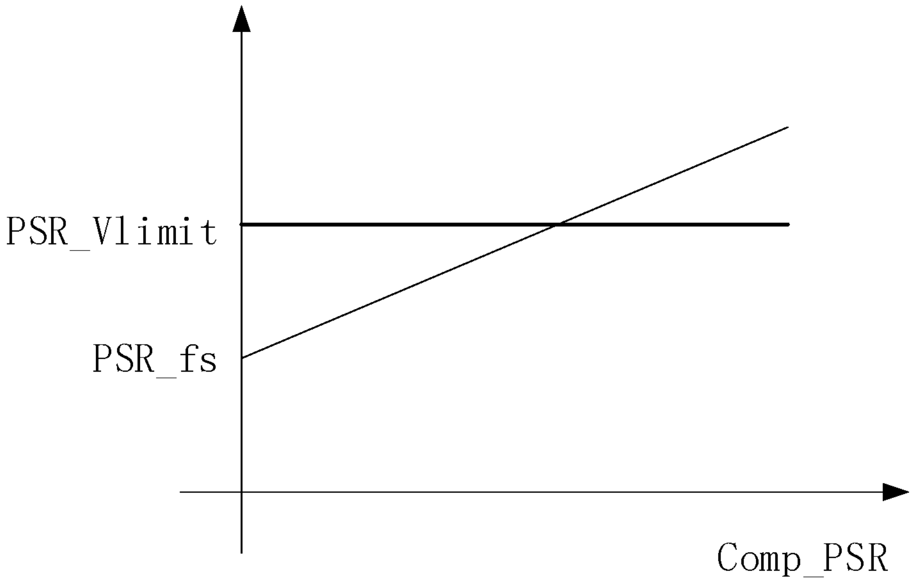
FIG. 6 shows relationships of a primary-side amplified error signal with a primary-side frequency control signal and a primary-side on-time control signal according to an embodiment of the present invention.

FIG. 6 shows relationships of the primary-side amplified error signal with the primary-side frequency control signal and the primary-side on-time control signal according to an embodiment of the present invention. Referring to FIG. 6, in this embodiment, the primary-side frequency control signal PSR_fs is positively correlated with the primary-side amplified error signal Comp_PSR. That is, it rises as the primary-side amplified error signal Comp_PSR rises. In contrast, the primary-side on-time control signal PSR_Vlimit is constant and does not vary as the primary-side amplified error signal Comp_PSR varies. Of course, in other embodiments, the primary-side amplified error signal Comp_PSR may have different relationships with the primary-side frequency control signal PSR_fs and the primary-side on-time control signal PSR_Vlimit, and the present invention is not limited in this regard.

In the SSR mode, the secondary-side regulator includes the secondary-side regulation signal generation module, receives a feedback signal of the output voltage of the isolated power converter, generates the first control signal and couples the first control signal to the primary-side regulator. The primary-side regulator includes the follow-up SSR module, receives the first control signal and generates the third control signal that controls the state of the primary-side power transistor. The first control signal Vcontrol may contain only a signal indicating a turn-on timing of the primary-side power transistor. At the secondary side, a comparator or error amplifier may produce a turn-on signal for the primary-side power transistor. After the turn-on timing is received at the primary side, a timing circuit or frequency-based on-time control circuit may produce a turn-off signal.

In a first example, the secondary-side regulation signal generation module 11 includes a second comparator, which compares the feedback signal with a second reference value and outputs a second comparison result. The first control signal indicating a turn-on timing of the primary-side power transistor is produced from the second comparison result. In a second example, the secondary-side regulation signal generation module 11 includes a second operational amplifier and a second frequency control module. The second operational amplifier amplifies an error between the feedback signal and the second reference value and outputs a secondary-side amplified error signal. The second frequency control module receives the secondary-side amplified error signal and outputs the first control signal that indicates the turn-on timing of the primary-side power transistor.

In any of the first and second examples, the follow-up SSR module 22 may include a frequency-based on-time control circuit and a second drive generator module. The frequency-based on-time control circuit may receive the first control signal and output a secondary-side on-time control signal for controlling the on-time of the primary-side power transistor. The second drive generator module may receive the first control signal, the secondary-side on-time control signal and the primary-side current sample signal and output the third control signal to the primary-side power transistor.

In any of the first and second examples, the follow-up SSR module 22 may include a timing circuit and the second drive generator module. The timing circuit may receive the first control signal and output, after a predetermined period of time elapses after the primary-side power transistor is turned on under the action of the first control signal, the secondary-side on-time control signal for controlling the on-time of the primary-side power transistor. The second drive generator module may receive the first control signal and the secondary-side on-time control signal and output the third control signal to the primary-side power transistor.

In some other examples, the first control signal Vcontrol may include not only a signal for generating a turn-on timing of the primary-side power transistor but also a signal for generating a turn-off timing of the primary-side power transistor. At the primary side, a comparator or error amplifier may produce a turn-on signal for the primary-side power transistor, and a timing circuit may produce a turn-off signal for the primary-side power transistor. That is, differing from the above example, the turn-off signal may be produced by the timing circuit.

In a first example, the secondary-side regulation signal generation module 11 includes a second comparator, a timing circuit and a second logic circuit. The second comparator compares the feedback signal with a second reference value and outputs a second comparison result indicating a turn-on timing of the primary-side power transistor. The timing circuit starts a timer based on the turn-on timing of the primary-side power transistor. After the elapse of a predetermined period of time, it outputs a secondary-side on-time control signal that controls the on-time of the primary-side power transistor. The second logic circuit generates the first control signal based on both the second comparison result and the secondary-side on-time control signal.

In a second example, the secondary-side regulation signal generation module 11 includes a second operational amplifier, a second frequency control module, a timing circuit and a second logic circuit. The second operational amplifier amplifies an error between the feedback signal and the second reference value and outputs a secondary-side amplified error signal. The second frequency control module receives the secondary-side amplified error signal and outputs a second frequency control signal indicating a turn-on timing of the primary-side power transistor. The timing circuit starts a timer based on the turn-on timing of the primary-side power transistor and outputs, after the elapse of a predetermined period of time, a secondary-side on-time control signal that controls the on-time of the primary-side power transistor. The second logic circuit produces the first control signal based on the second frequency control signal and the secondary-side on-time control signal.

In any of the first and second examples, the follow-up SSR module 22 may include a second drive generator module, the second drive generator module receives the first control signal and generates the third control signal that controls the state of the primary-side power transistor.

The present invention will be further described below by way of several specific examples. For the sake of brevity, the following examples do not cover all possible combinations of the above-described features of the primary-side and secondary-side regulators.

Figure 7A:
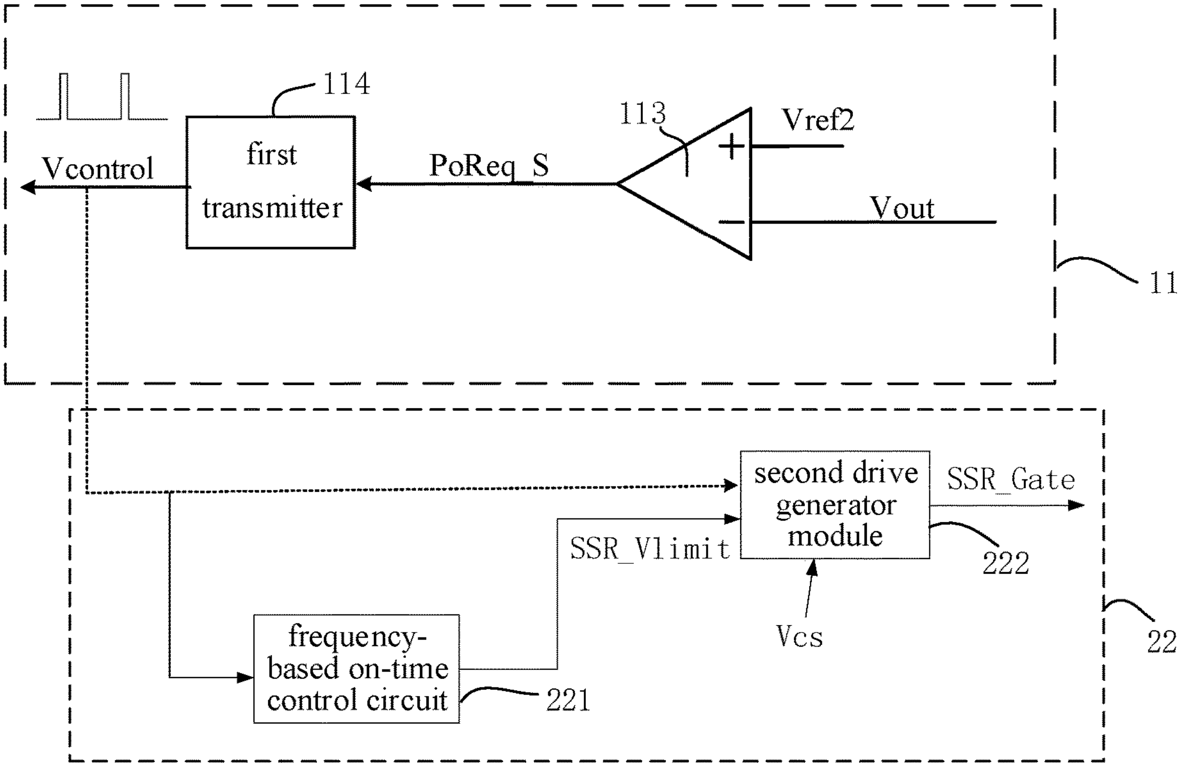
FIG. 7*a* schematically illustrates a secondary-side regulation signal generation module and a follow-up SSR module according to an embodiment of the present invention.

FIG. **7*a* schematically illustrates the secondary-side regulation signal generation module and the follow-up SSR module according to an embodiment of the present invention. In this example, the first control signal Vcontrol carries only turn-on information of the primary-side power transistor 107. That is, the first control signal Vcontrol carries only a turn-on timing of the primary-side power transistor 107. Moreover, in this example, a control method is employed, which is based on ripple in the output voltage. Referring to FIG. 7*a*, in this example, the secondary-side regulation signal generation module 11 includes a second comparator 113, which compares a feedback signal Vout with a second reference value Vref2, outputs a second comparison result PoReq_S and generates, based on the second comparison result, the first control signal that indicates the turn-on timing of the primary-side power transistor. The secondary-side regulation signal generation module 11 further includes a first transmitter 114, which receives the second comparison result PoReq_S and transmits the first control signal Vcontrol that carries the turn-on timing of the primary-side power transistor 107**.

The follow-up SSR module 22 includes a frequency-based on-time control circuit 221 and a second drive generator module 222. The frequency-based on-time control circuit 221 receives the first control signal Vcontrol from the first transmitter 114 and outputs a secondary-side on-time control signal SSR_Vlimit for controlling the on-time of the primary-side power transistor 107. The second drive generator module 222 receives the first control signal Vcontrol, the secondary-side on-time control signal SSR_Vlimit and a primary-side current sample signal Vcs and outputs the third control signal SSR_Gate.

In this example, the secondary-side regulation signal generation module 11 outputs the first control signal Vcontrol that carries only the turn-on timing of the primary-side power transistor 107 and is coupled to the primary-side regulator 20. The follow-up SSR module 22 in the primary-side regulator 20 receives the first control signal Vcontrol and obtains a control signal that contains and controls the on-time of the primary-side power transistor 107 by configuring the frequency-based on-time control circuit 221. As such, the third control signal SSR_Gate capable of controlling turn-on and turn-off of the primary-side power transistor 107 is eventually output to the primary-side power transistor 107.

Figure 7B:
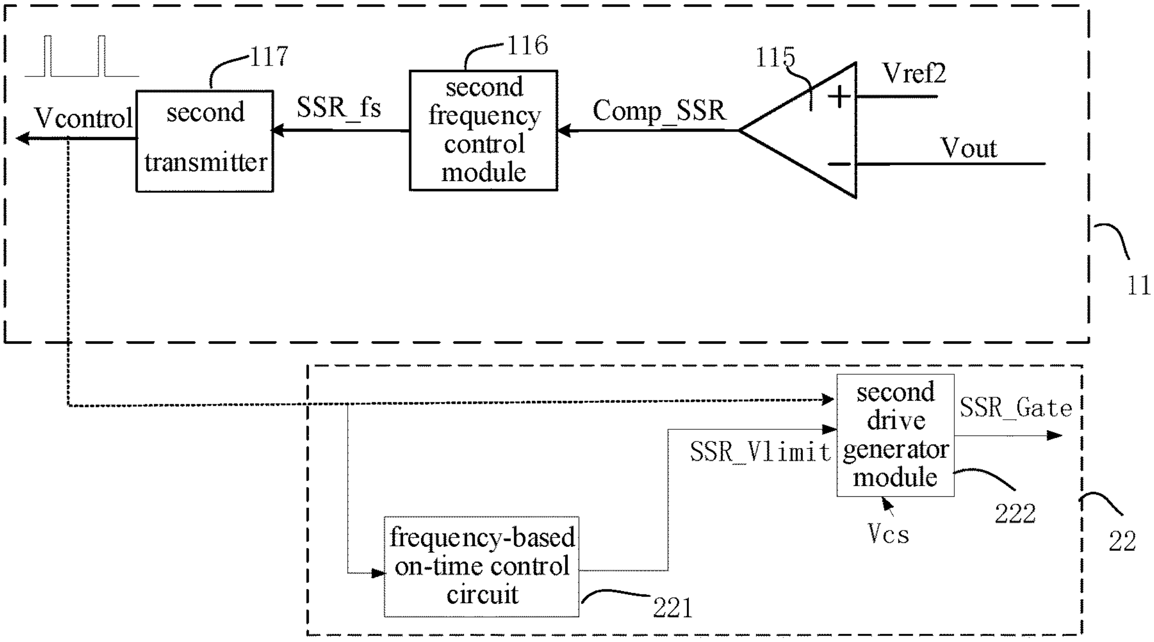
FIG. 7*b* schematically illustrates a secondary-side regulation signal generation module and a follow-up SSR module according to an alternative embodiment of the present invention.

FIG. 7*b* schematically illustrates the secondary-side regulation signal generation module and the follow-up SSR module according to an alternative embodiment of the present invention. In this example, the first control signal Vcontrol carries only turn-on information of the primary-side power transistor 107. That is, it carries only a turn-on timing of the primary-side power transistor 107. Moreover, in this example, a control method is employed, which is based on an average output voltage. Referring to FIG. 7*b*, in this example, the secondary-side regulation signal generation module 11 includes a second operational amplifier 115 and a second frequency control module 116. The second operational amplifier 115 amplifies an error between a feedback signal Vout and a second reference value Vref2 and outputs a secondary-side amplified error signal Comp_SSR. The second reference value Vref2 is input to a non-inverting input terminal of the second amplifier 115, and the feedback signal Vout is input to an inverting input terminal of the second amplifier 115. The secondary-side amplified error signal Comp_SSR is output from an output terminal of the second amplifier 115. The second frequency control module 116 receives the secondary-side amplified error signal Comp_SSR and outputs the first control signal that indicates a turn-on timing of the primary-side power transistor.

Specifically, the secondary-side frequency control signal SSR_fs output from the second frequency control module 116 controls the frequency, and hence the turn-on timing, of the primary-side power transistor 107. The secondary-side regulation signal generation module 11 further includes a second transmitter 117, which receives the secondary-side frequency control signal SSR_fs and transmits the first control signal Vcontrol that contains the turn-on timing of the primary-side power transistor 107.

The follow-up SSR module 22 includes a frequency-based on-time control circuit 221 and a second drive generator module 222. The frequency-based on-time control circuit 221 receives the first control signal Vcontrol and outputs the secondary-side on-time control signal SSR_Vlimit for controlling the on-time of the primary-side power transistor 107. The second drive generator module 222 receives the first control signal Vcontrol, the secondary-side on-time control signal SSR_Vlimit and a primary-side sample signal Vcs and outputs the third control signal SSR_Gate.

In this example, the secondary-side regulation signal generation module 11 outputs the first control signal Vcontrol that only contains the turn-on timing of the primary-side power transistor 107 and is coupled to the primary-side regulator 20. The follow-up SSR module 22 in the primary-side regulator 20 receives the first control signal Vcontrol and obtains a control signal that contains and controls the on-time of the primary-side power transistor 107 by configuring the frequency-based on-time control circuit 221. As such, the third control signal SSR_Gate capable of controlling turn-on and turn-off of the primary-side power transistor 107 is eventually output to the primary-side power transistor 107.

For more details about the second drive generator module, reference can be made to the above description of the first drive generator module, and further description thereof is omitted here.

Figure 7C:
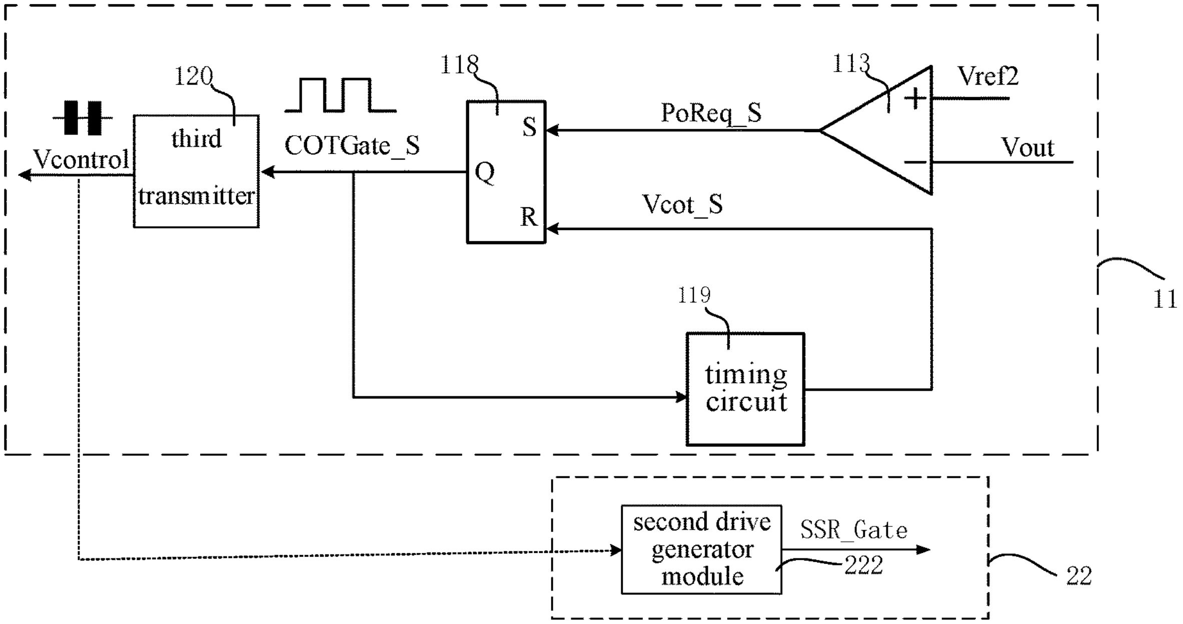
FIG. 7*c* schematically illustrates a secondary-side regulation signal generation module and a follow-up SSR module according to another alternative embodiment of the present invention.

FIG. 7*c* schematically illustrates the secondary-side regulation signal generation module and the follow-up SSR module according to another alternative embodiment of the present invention. In this example, the first control signal Vcontrol contains turn-on and turn-off information of the primary-side power transistor 107. That is, it carries both a turn-on timing and a turn-off timing of the primary-side power transistor 107. Moreover, in this example, a control method is employed, which is based on ripple in the output voltage. Referring to FIG. 7*c*, in this example, the secondary-side regulation signal generation module 11 includes a second comparator 113, a second logic circuit 118 and a timing circuit 119. The second comparator 113 compares a feedback signal Vout and a second reference value Vref2 and outputs a second comparison result PoReq_S. The second reference value Vref2 is input to a non-inverting input terminal of the second comparator 113, and the feedback signal Vout to an inverting input terminal thereof. The second comparison result PoReq_S is output from an output terminal of the second comparator 113. The timing circuit 119 starts a timer based on the turn-on timing of the primary-side power transistor 107 and outputs, after the elapse of a predetermined period of time, a secondary-side on-time control signal Vcot_S that controls the on-time of the primary-side power transistor. The second logic circuit 118 produces the first control signal based on the second comparison result PoReq_S and the secondary-side on-time control signal Vcot_S.

In this example, the second logic circuit 118 is preferred to be an RS flip-flop. The second comparison result PoReq_S is received at a reset terminal R of the RS flip-flop, and a signal COTGate_S for controlling turn-on and turn-off of the primary-side power transistor 107 is output from an output terminal Q of the RS flip-flop. The timing circuit 119 receives the signal COTGate_S for controlling turn-on and turn-off of the primary-side power transistor 107 and outputs the secondary-side on-time control signal Vcot_S for controlling the primary-side power transistor 107 to a set terminal S of the flip-flop.

The secondary-side regulation signal generation module 11 further includes a third transmitter 120, which receives the signal COTGate_S for controlling turn-on and turn-off of the primary-side power transistor 107 and outputs the first control signal Vcontrol that contains both the turn-on and turn-off timings of the primary-side power transistor 107.

The follow-up SSR module 22 includes a second drive generator module 222, which receives the first control signal Vcontrol and outputs the third control signal SSR_Gate. The third control signal SSR_Gate contains information about the turn-on and turn-off timings of the primary-side power transistor 107.

In this example, the secondary-side regulation signal generation module 11 outputs the first control signal Vcontrol that contains the turn-on and turn-off timings of the primary-side power transistor 107 and is coupled to the primary-side regulator 20. In the primary-side regulator 20, only a drive generator module is included. As such, the third control signal SSR_Gate capable of controlling turn-on and turn-off of the primary-side power transistor 107 is eventually output to the primary-side power transistor 107.

In the control method employed in the above-discussed examples of FIGS. 7*a* to 7*c*, those of FIGS. 7*a* and 7*c* are based on ripple in the output voltage. In the example of FIG. 7*a*, the first control signal Vcontrol contains only a turn-on timing of the primary-side power transistor 107. In the example of FIG. 7*c*, the first control signal Vcontrol contains both turn-on and turn-off timings of the primary-side power transistor 107. The control method employed in the above-discussed example of FIG. 7*b* is based on an average output voltage. In this method, the first control signal Vcontrol contains only a turn-on timing of the primary-side power transistor 107. It is a matter of course that other combinations of the features of the secondary-side regulation signal generation module 11 and the follow-up SSR module 22 are also possible, which are, however, not exemplified therein. Moreover, the secondary-side regulation signal generation module 11 and the follow-up SSR module 22 may have other structures than those described above, within the scope of the present invention.

Figure 8:
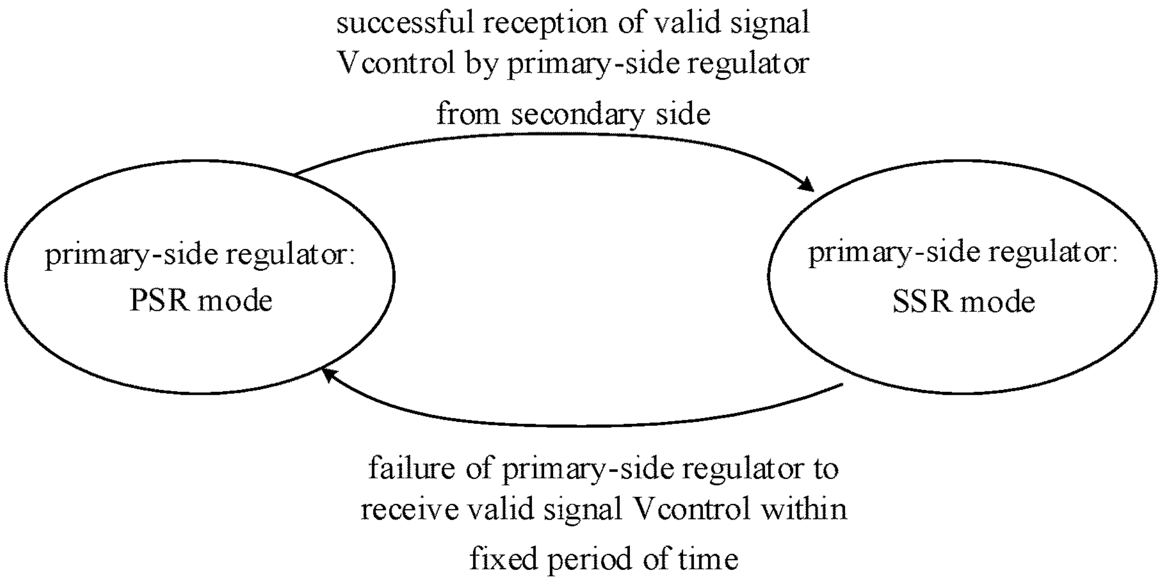
FIG. 8 schematically illustrates operation of a regulation switching module according to an embodiment of the present invention.

FIG. 8 schematically illustrates operation of the regulation switching module according to an embodiment of the present invention. Referring to FIG. 8, when the primary-side regulator 20 is operating in the PSR mode, in response to the reception of the valid first control signal Vcontrol at the regulation switching module 23, the primary-side regulator 20 switches from the PSR mode to the SSR mode. During operation of the primary-side regulator 20 in the SSR mode, if the regulation switching module 23 fails to receive the valid first control signal Vcontrol within a predetermined period of time, then the primary-side regulator 20 switches from the SSR mode to the PSR mode. The predetermined period of time may be determined, as required by practical applications.

In one example, in the PSR mode enabled by the PSR module 21, the output voltage can rise up to a first reference value Vref1, and in the SSR mode enabled by the follow-up SSR module 22, the output voltage can rise up to a second reference value Vref2. The first reference value Vref1 is not greater than the second reference value Vref2. As a result, during startup of the isolated power converter, the output voltage can rise smoothly without overshooting, enhancing reliability and security of the system.

The present invention also provides a control method for the above-discussed isolated power converter. The control method includes:

receiving a feedback signal Vout of the output voltage of the isolated power converter 100 at the secondary-side regulation signal generation module 11; generating a first primary-side power transistor control signal Vcontrol and coupling the first control signal Vcontrol to the primary-side regulator 20; receiving a voltage signal Vdeg in a winding of the isolated power converter at the PSR module 21; generating a second primary-side power transistor control signal PSR_Gate for controlling the state of the primary-side power transistor 107, thereby executing a PSR mode; receiving the first control signal Vcontrol at the follow-up SSR module 22 and generating a third primary-side power transistor control signal SSR_Gate for controlling the state of the primary-side power transistor 107, thereby executing an SSR mode; and receiving the first control signal Vcontrol at the regulation switching module 23, executing a switching of the primary-side regulator 20 between the PSR and SSR modes. Moreover, during startup of the isolated power converter 100, the PSR mode is first enabled by the PSR module 21, and a mode switching is then caused by the regulation switching module 23 to allow the follow-up SSR module 22 to enable the SSR mode. This can avoid overshooting of the output voltage during startup.

In summary, the present invention provides a controller, an isolated power converter and a control method. The controller includes a primary-side regulator and a secondary-side regulator. The secondary-side regulator includes a secondary-side regulation signal generation module, which receives a feedback signal of an output voltage of the isolated power converter, generates a first control signal and couples the first control signal to the primary-side regulator. The primary-side regulator includes a PSR module, which receives a voltage signal across a winding of the isolated power converter and generates a second control signal for controlling a state of the primary-side power transistor, thereby executing a PSR mode. The primary-side regulator also includes a follow-up SSR module, which receives the first control signal and generates a third control signal for controlling the state of the primary-side power transistor, thereby executing an SSR mode. The primary-side regulator also includes a regulation switching module, which receives the first control signal and thereby allows a switching of the primary-side regulator between the PSR and SSR modes. During startup of the isolated power converter, the PSR mode is first enabled by the PSR module, and a mode switching is then caused by the regulation switching module to allow the follow-up SSR module to enable the SSR mode. This can avoid overshooting of the output voltage during startup.

The description presented above is merely that of a few preferred embodiments of the present invention and is not intended to limit the scope thereof in any sense. Any and all changes and modifications made by those of ordinary skill in the art based on the above teachings fall within the scope of the invention.

The invention claimed is:

1. A controller for use with an isolated power converter, the controller comprising a primary-side regulator and a secondary-side regulator, the secondary-side regulator comprising a secondary-side regulation signal generation module, which receives a feedback signal of an output voltage of the isolated power converter, generates a first control signal and couples the first control signal to the primary-side regulator, the primary-side regulator comprising:

a primary-side regulation (PSR) module, which receives a voltage signal across a winding in the isolated power converter and generates a second control signal for controlling a state of the primary-side power transistor, thereby executing a PSR mode;

a follow-up secondary-side regulation (SSR) module, which receives the first control signal and generates a third control signal for controlling the state of the primary-side power transistor, thereby executing an SSR mode; and a regulation switching module, which receives the first control signal and thereby executes a switching of the primary-side regulator between the PSR mode and the SSR mode, wherein the secondary-side regulation signal generation module comprises:

a second comparator, which compares the feedback signal with a second reference value, outputs a second comparison result and provides a turn-on instruction to the primary-side power transistor based on the second comparison result;

a timing circuit, which starts a timer based on the turn-on instruction of the primary-side power transistor and outputs, after the elapse of a predetermined period of time, a secondary-side on-time control signal for controlling an on-time of the primary-side power transistor; and a second logic circuit, which generates the first control signal based on the second comparison result and the secondary-side on-time control signal;

or wherein the secondary-side regulation signal generation module comprises:

a second operational amplifier, which amplifies an error between the feedback signal and a second reference value and outputs a secondary-side amplified error signal;

a second frequency control module, which receives the secondary-side amplified error signal and outputs a second frequency control signal providing a turn-on instruction of the primary-side power transistor; and a timing circuit, which starts a timer based on the turn-on instruction of the primary-side power transistor and outputs, after the elapse of a predetermined period of time, a secondary-side on-time control signal for controlling an on-time of the primary-side power transistor; and a second logic circuit, which generates the first control signal based on the second frequency control signal and the secondary-side on-time control signal.

2. The controller according to claim 1, wherein the PSR module receives the voltage signal across two terminals of an auxiliary winding in the isolated power converter, the auxiliary winding is coupled to a primary-side winding in the isolated power converter; or wherein the PSR module receives the voltage signal across two terminals of a primary-side winding in the isolated power converter.

3. The controller according to claim 1, wherein the PSR module comprises:

a sample-and-hold module, which receives the voltage signal and samples the voltage signal as an output voltage sample signal after the primary-side power transistor is turned off;

a first operational amplifier, which amplifies an error between the output voltage sample signal and a first reference value and outputs a primary-side amplified error signal;

a first frequency control module, which receives the primary-side amplified error signal and outputs a primary-side frequency control signal for controlling a switching frequency of the primary-side power transistor; and a turn-off control module, which receives the primary-side amplified error signal and outputs a primary-side on-time control signal for controlling an on-time of the primary-side power transistor.

4. The controller according to claim 3, wherein the primary-side regulator comprises:

a first drive generator module, which receives the primary-side frequency control signal, the primary-side on-time control signal and a primary-side current sample signal, provides a turn-on instruction to the primary-side power transistor based on the primary-side frequency control signal, provides a turn-off instruction to the primary-side power transistor based on the primary-side on-time control signal and the primary-side current sample signal, and outputs the second control signal to the primary-side power transistor, and wherein the first drive generator module comprises:

a first comparator, which compares the primary-side on-time control signal with the primary-side current sample signal, outputs a first comparison result and provides the turn-on instruction to the primary-side power transistor based on the first comparison result; and a first logic circuit, which generates the second control signal based on the first comparison result and the primary-side frequency control signal.

5. The controller according to claim 1, wherein the secondary-side regulation signal generation module comprises:

a second comparator, which compares the feedback signal with a second reference value, outputs a second comparison result and generates the first control signal that provides a turn-on instruction to the primary-side power transistor based on the second comparison result.

6. The controller according to claim 5, wherein the follow-up SSR module comprises:

a frequency-based on-time control circuit, which receives the first control signal and outputs a secondary-side on-time control signal for controlling an on-time of the primary-side power transistor; and a second drive generator module, which receives the first control signal, the secondary-side on-time control signal and a primary-side current sample signal and outputs the third control signal to the primary-side power transistor.

7. The controller according to claim 5, wherein the follow-up SSR module comprises:

a timing circuit, which receives the first control signal and outputs, if the first control signal instructs to turn on the primary-side power transistor, a secondary-side on-time control signal for controlling the on-time of the primary-side power transistor, after the elapse of a predetermined period of time; and a second drive generator module, which receives the first control signal and the secondary-side on-time control signal and outputs the third control signal to the primary-side power transistor.

8. The controller according to claim 1, wherein the secondary-side regulation signal generation module comprises:

a second operational amplifier, which amplifies an error between the feedback signal and a second reference value and outputs a secondary-side amplified error signal; and a second frequency control module, which receives the secondary-side amplified error signal and outputs the first control signal that provides a turn-on instruction to the primary-side power transistor.

9. The controller according to claim 8, wherein the follow-up SSR module comprises:

a frequency-based on-time control circuit, which receives the first control signal and outputs a secondary-side on-time control signal for controlling an on-time of the primary-side power transistor; and a second drive generator module, which receives the first control signal, the secondary-side on-time control signal and a primary-side current sample signal and outputs the third control signal to the primary-side power transistor.

10. The controller according to claim 8, wherein the follow-up SSR module comprises:

a timing circuit, which receives the first control signal and outputs, if the first control signal instructs to turn on the primary-side power transistor, the secondary-side on-time control signal for controlling the on-time of the primary-side power transistor, after the elapse of a predetermined period of time; and a second drive generator module, which receives the first control signal and the secondary-side on-time control signal and outputs the third control signal to the primary-side power transistor.

11. The controller according to claim 1, wherein the follow-up SSR module comprises a second drive generator module, which receives the first control signal and generates the third control signal for controlling a state of the primary-side power transistor.

12. The controller according to claim 1, wherein when the primary-side regulator is in the PSR mode, upon the regulation switching module receiving the first control signal that is valid, the primary-side regulator switches from the PSR mode to the SSR mode, and wherein when the primary-side regulator is in the SSR mode, if the regulation switching module does not receive the first control signal that is valid within a predetermined period of time, the primary-side regulator switches from the SSR mode to the PSR mode.

13. The controller according to claim 1, wherein the PSR module executes the PSR mode, in which the output voltage rises up to a first reference value, wherein the follow-up SSR module executes the SSR mode, in which the output voltage rises up to a second reference value, and wherein the first reference value is not greater than the second reference value.

14. An isolated power converter, comprising the controller as defined in claim 1.

15. A control method for an isolated power converter, the control method comprising:

at a secondary-side regulation signal generation module, receiving a feedback signal of an output voltage of the isolated power converter, generating a first control signal and coupling the first control signal to a primary-side regulator;

at a primary-side regulation (PSR) module, receiving a voltage signal across a winding in the isolated power converter and generating a second control signal for controlling a state of the primary-side power transistor, thereby executing a PSR mode;

at a follow-up secondary-side regulation (SSR) module, receiving the first control signal and generating a third control signal for controlling the state of the primary-side power transistor, thereby executing an SSR mode;

at a regulation switching module, receiving the first control signal and executing a switching of the primary-side regulator between the PSR and SSR modes; and wherein the generating the first control signal comprises either:

(i) comparing, by a second comparator, the feedback signal with a second reference value, outputting a second comparison result, and providing a turn-on instruction to a primary-side power transistor based on the second comparison result;

starting, by a timing circuit, a timer based on the turn-on instruction of the primary-side power transistor, and outputting, after the elapse of a predetermined period of time, a secondary-side on-time control signal for controlling an on-time of the primary-side power transistor; and generating, by a second logic circuit, the first control signal based on the second comparison result and the secondary-side on-time control signal;

or (ii) amplifying, by a second operational amplifier, an error between the feedback signal and a second reference value and outputting a secondary-side amplified error signal;

receiving, by a second frequency control module, the secondary-side amplified error signal and outputting a second frequency control signal providing a turn-on instruction of the primary-side power transistor;

starting, by a timing circuit, a timer based on the turn-on instruction of the primary-side power transistor, and outputting, after the elapse of a predetermined period of time, a secondary-side on-time control signal for controlling an on-time of the primary-side power transistor; and generating, by a second logic circuit, the first control signal based on the second frequency control signal and the secondary-side on-time control signal;

during startup of the isolated power converter, first executing the PSR mode by the PSR module and then executing a mode switching by the regulation switching module so that the SSR mode is executed by the follow-up SSR module.

* * * * *